US007703709B2

(12) United States Patent
Akabane et al.

(10) Patent No.: US 7,703,709 B2
(45) **Date of Patent: *Apr. 27, 2010**

(54) ELECTROMAGNETIC FUEL INJECTION VALVE

(75) Inventors: Akira Akabane, Miyagi (JP); Hirokazu Tanuma, Miyagi (JP)

(73) Assignee: Keihin Corporation, Tokyo (JP)

( * ) Notice: Subject to any disclaimer, the term of this patent is extended or adjusted under 35 U.S.C. 154(b) by 519 days.

This patent is subject to a terminal disclaimer.

(21) Appl. No.: 11/659,112

(22) PCT Filed: Sep. 22, 2005

(86) PCT No.: PCT/JP2005/017452

§ 371 (c)(1),
(2), (4) Date: Feb. 1, 2007

(87) PCT Pub. No.: WO2006/035656

PCT Pub. Date: Apr. 6, 2006

(65) Prior Publication Data

US 2009/0007886 A1 Jan. 8, 2009

(30) Foreign Application Priority Data

Sep. 27, 2004 (JP) ............................ 2004-279698
Sep. 27, 2004 (JP) ............................ 2004-279699

(51) Int. Cl.
*B05B 1/30* (2006.01)
*F16K 31/02* (2006.01)
*F02M 51/00* (2006.01)

(52) U.S. Cl. .............. 239/585.1; 239/585.2; 239/585.3; 239/585.4; 251/129.01; 251/129.15; 251/129.16; 251/129.2; 251/129.21; 123/472; 123/476

(58) Field of Classification Search .............. 239/585.1, 239/585.4, 585.2, 585.3; 251/129.21, 129.01, 251/129.15, 129.16, 129.2; 123/476, 472
See application file for complete search history.

(56) References Cited

U.S. PATENT DOCUMENTS 4,230,156 A * 10/1980 Frantz ..................... 137/625.5
4,610,080 A * 9/1986 Hensley ..................... 29/602.1

(Continued)

FOREIGN PATENT DOCUMENTS

JP 2-241971 A 9/1990

(Continued)

*Primary Examiner*—Dinh Q Nguyen
*Assistant Examiner*—Steven Cernoch
(74) *Attorney, Agent, or Firm*—Arent Fox LLP

(57) ABSTRACT

An electromagnetic fuel injection valve in which a first resin-molded layer that is made of a synthetic resin, covers a solenoid section, and forms a coupler main portion that defines a coupler is covered by a second resin-molded layer different from that of the first resin-molded layer so that an outer face of the coupler main portion is exposed from a middle part up to the extremity of the coupler main portion. An endless engagement groove is provided on the outer periphery of the middle pad of the coupler main portion of the first resin-molded layer, the second resin-molded layer engaging with the endless engagement groove. An extending portion extending further outward than the engagement groove is formed in the second resin-molded layer so that the extending portion makes contact with an outer face of the coupler main portion when in a non-engaged state and covers the coupler main portion.

2 Claims, 6 Drawing Sheets

U.S. PATENT DOCUMENTS

| | | | | | |
|---|---|---|---|---|---|
| 4,944,486 | A * | 7/1990 | Babitzka | | 251/129.21 |
| 5,165,656 | A * | 11/1992 | Maier et al. | | 251/129.21 |
| 5,236,174 | A * | 8/1993 | Vogt et al. | | 251/129.21 |
| 5,275,341 | A * | 1/1994 | Romann et al. | | 239/585.4 |
| 5,494,224 | A * | 2/1996 | Hall et al. | | 239/585.5 |
| 5,580,001 | A * | 12/1996 | Romann et al. | | 239/585.4 |
| 5,950,932 | A * | 9/1999 | Takeda et al. | | 239/585.4 |
| 5,996,912 | A * | 12/1999 | Ren et al. | | 239/585.5 |
| 7,296,781 | B2 * | 11/2007 | Akabane | | 251/129.21 |
| 7,520,449 | B2 * | 4/2009 | Matsuo et al. | | 239/585.5 |
| 2001/0045473 | A1 * | 11/2001 | Landschoot et al. | | 239/585.1 |
| 2004/0188552 | A1 * | 9/2004 | Saito et al. | | 239/585.1 |
| 2006/0208109 | A1 * | 9/2006 | Akabane | | 239/585.1 |
| 2006/0214032 | A1 * | 9/2006 | Akabane | | 239/585.1 |
| 2007/0220747 | A1 * | 9/2007 | Akabane | | 29/888.4 |
| 2008/0251613 | A1 * | 10/2008 | Akabane et al. | | 239/585.1 |
| 2008/0290305 | A1 * | 11/2008 | Akabane | | 251/65 |

FOREIGN PATENT DOCUMENTS

| | | | | |
|---|---|---|---|---|
| JP | 5-503976 | A | | 6/1993 |
| JP | 2004-76700 | A | | 3/2004 |
| JP | 2004-293313 | A | | 10/2004 |
| JP | 2004293313 | A | * | 10/2004 |
| JP | 2005-256640 | A | | 9/2005 |
| JP | 2005256640 | A | * | 9/2005 |

* cited by examiner

ELECTROMAGNETIC FUEL INJECTION VALVE

TECHNICAL FIELD

The present invention relates to an electromagnetic fuel injection valve that includes a valve operating section in which a valve body is housed within a valve housing having a valve seat at a front end part, the valve body being spring-biased in a direction that seats the valve body on the valve seat, a solenoid section in which a coil assembly is housed within a solenoid housing provided so as to be connected to the valve housing and extend rearward, the coil assembly being capable of exhibiting an electromagnetic force for driving the valve body so as to make the valve body separate from the valve seat, and a resin-molded section in which a first resin-molded layer, which is made of a synthetic resin, covers the solenoid section, and forms a coupler main portion defining a framework of a power-receiving coupler, a power-receiving connecting terminal being connected to a coil of the coil assembly and facing the power-receiving coupler, is covered by a second resin-molded layer made of a synthetic resin that is different from that of the first resin-molded layer so that an outer face of the coupler main portion is exposed from a middle part up to the extremity of the coupler main portion.

BACKGROUND ART

An electromagnetic fuel injection valve in which a solenoid section is covered by a resin-molded section having an integral power-receiving coupler is already known from, for example, Patent Publication 1.

Patent Publication 1: Japanese Patent Application Laid-open No. 2004-76700

DISCLOSURE OF THE INVENTION

Problems to be Solved by the Invention

The resin-molded section of the electromagnetic fuel injection valve disclosed in Patent Publication 1 above is formed from one type of synthetic resin. However, the resin-molded section covering the solenoid section is required not only to have a function of suppressing the outward radiation of operating noise occurring in the solenoid section but also to have a high strength since it is necessary for the power-receiving coupler to have a relatively high strength in order to enhance the reliability of an electrical connection, but it is difficult to form a resin-molded section having sufficient strength while suppressing the operating noise sufficiently using a single type of synthetic resin such as that disclosed in Patent Publication 1 above.

The present applicant has already proposed an electromagnetic fuel injection valve in which a power-receiving coupler is formed from two layers, that is, a first resin-molded layer forming a coupler main portion that defines a framework of the power-receiving coupler and a second resin-molded layer made of a material having a lower bending strength than that of the first resin-molded layer and covering the first resin-molded layer so that the first resin-molded layer is exposed from a middle part up to the extremity of the power-receiving coupler, thus imparting to the power-receiving coupler a strength that can ensure the reliability of an electrical connection, and at the same time enabling the generation of operating noise to be suppressed effectively (Japanese Patent Application No. 2004-65892).

However, if the power-receiving coupler is formed by double layer molding using such synthetic resins, a gap or a bulge occurs in the first resin-molded layer or an outer end part of the second resin-molded layer due to shrinkage caused by cooling after molding of the second resin-molded layer, the connectivity of a power-supplying coupler to the power-receiving coupler might be degraded, and the merchantability might deteriorate.

The present invention has been accomplished under the above-mentioned circumstances, and it is an object thereof to provide an electromagnetic fuel injection valve that can prevent a gap or a bulge from occurring in a boundary section between two resin-molded layers when a power-receiving coupler is formed by double layer molding using synthetic resins, thus improving the connectivity of a power-supplying coupler to a power-receiving coupler and the merchantability.

Means of Solving the Problems

In order to attain the above object, according to a first aspect of the present invention, there is provided an electromagnetic fuel injection valve comprising a valve operating section in which a valve body is housed within a valve housing having a valve seat in a front end part, the valve body being spring-biased in a direction that seats the valve body on the valve seat, a solenoid section in which a coil assembly is housed within a solenoid housing provided so as to be connected to the valve housing and extend rearward, the coil assembly being capable of exhibiting an electromagnetic force for driving the valve body so as to make the valve body separate from the valve seat, and a resin-molded section in which a first resin-molded layer, which is made of a synthetic resin, covers the solenoid section, and forms a coupler main portion that defines a framework of a power-receiving coupler, a power-receiving connecting terminal being connected to a coil of the coil assembly and facing the power-receiving coupler, is covered by a second resin-molded layer made of a synthetic resin that is different from that of the first resin-molded layer so that an outer face of the coupler main portion is exposed from a middle part up to the extremity of the coupler main portion, characterized in that an endless engagement groove is provided on the outer periphery of the middle part of the coupler main portion of the first resin-molded layer, the second resin-molded layer engaging with the endless engagement groove, and an extending portion extending further outward than the engagement groove is formed in the second resin-molded layer so that the extending portion makes contact with an outer face of the coupler main portion when in a non-engaged state and covers the coupler main portion.

According to a second aspect of the present invention, in addition to the arrangement of the first aspect, an endless second engagement groove is provided on the outer periphery of a front end part of the first resin-molded layer, the entire periphery of a front edge of the second resin-molded layer engaging with the second engagement groove, and an engagement portion is provided on the outer periphery of the first resin-molded layer in a portion, along the axial direction of the valve housing, that corresponds to the coil assembly, the entire inner periphery of the second resin-molded layer engaging with the engagement portion so as to restrain rearward displacement of the second resin-molded layer.

EFFECTS OF THE INVENTION

In accordance with the first aspect of the present invention, when cooling is carried out after molding the power-receiving coupler having the double layer structure comprising the first resin-molded layer and the second resin-molded layer, which are made of synthetic resins that are different from each other, a shrinking stress acts on the second resin-molded layer further toward the inside than a portion that engages with the second engagement groove in a direction that shrinks it toward the solenoid housing, and a reaction force in a direction separating the second resin-molded layer from the engagement groove is thereby generated in a portion of the second resin-molded layer that corresponds to the engagement groove. However, a shrinking stress in a direction toward the outer periphery of the coupler main portion acts against the reaction force on the extending portion of the second resin-molded layer that extends further outward than the engagement groove, and by setting appropriate dimensions for the extending portion the shrinking stress in the direction toward the outer periphery of the coupler main portion can be made larger than the reaction force; as a result it is possible to prevent a gap or a bulge from occurring in a boundary section between the two resin-molded layers due to shrinkage when the second resin-molded layer is cooled, thus improving the connectivity of the power-supplying coupler to the power-receiving coupler and the merchantability.

Furthermore, in accordance with the second aspect of the present invention, when cooling is carried out after the resin-molded section having the double layer structure comprising the first resin-molded layer and the second resin-molded layer is molded, the second resin-molded layer attempts to shrink so as to separate its front edge from the second engagement groove in the front end part of the first resin-molded layer, but since the endless engagement portion provided on the outer periphery of the first resin-molded layer so as to restrain rearward displacement of the second resin-molded layer is disposed in the portion corresponding to the coil assembly, the distance between the second engagement groove and the engagement portion is relatively short, that is, the length of a section of the second resin-molded layer that attempts to shrink so as to separate the front edge from the second engagement groove of the first resin-molded layer becomes relatively short. Therefore, even if the second resin-molded layer shrinks, the amount of displacement of the front edge of the second resin-molded layer in the direction that separates it from the second engagement groove is very small, and it is possible to suppress lifting of the front edge of the second resin-molded section from the front end part of the first resin-molded section, thus preventing moisture, etc. from entering between the front end parts of the two resin-molded layers and thereby improving the merchantability.

EXPLANATION OF REFERENCE NUMERALS AND SYMBOLS

5 Valve Operating Section
6 Solenoid Section
7 Resin-Molded Section
8 Valve Seat
9 Valve Housing
10 Valve Body
11 Coil Assembly
12 Solenoid Housing
29 Coil
38 Power-Receiving Connecting Terminal
40 Power-Receiving Coupler
40*a* Coupler Main Portion
41 First Resin-Molded Layer
42 Second Resin-Molded Layer
42*a* Front Edge of Second Resin-Molded Layer
42*b* Extending Portion
43 Second Engagement Groove
45 Engagement Groove
44 Engagement Projection as Engagement Portion
48 Engagement Recess as Engagement Portion
49 Engagement Step as Engagement Portion

BEST MODE FOR CARRYING OUT THE INVENTION

Modes for carrying out the present invention are explained below by reference to embodiments of the present invention shown in the attached drawings.

Embodiment 1

Figure 1:
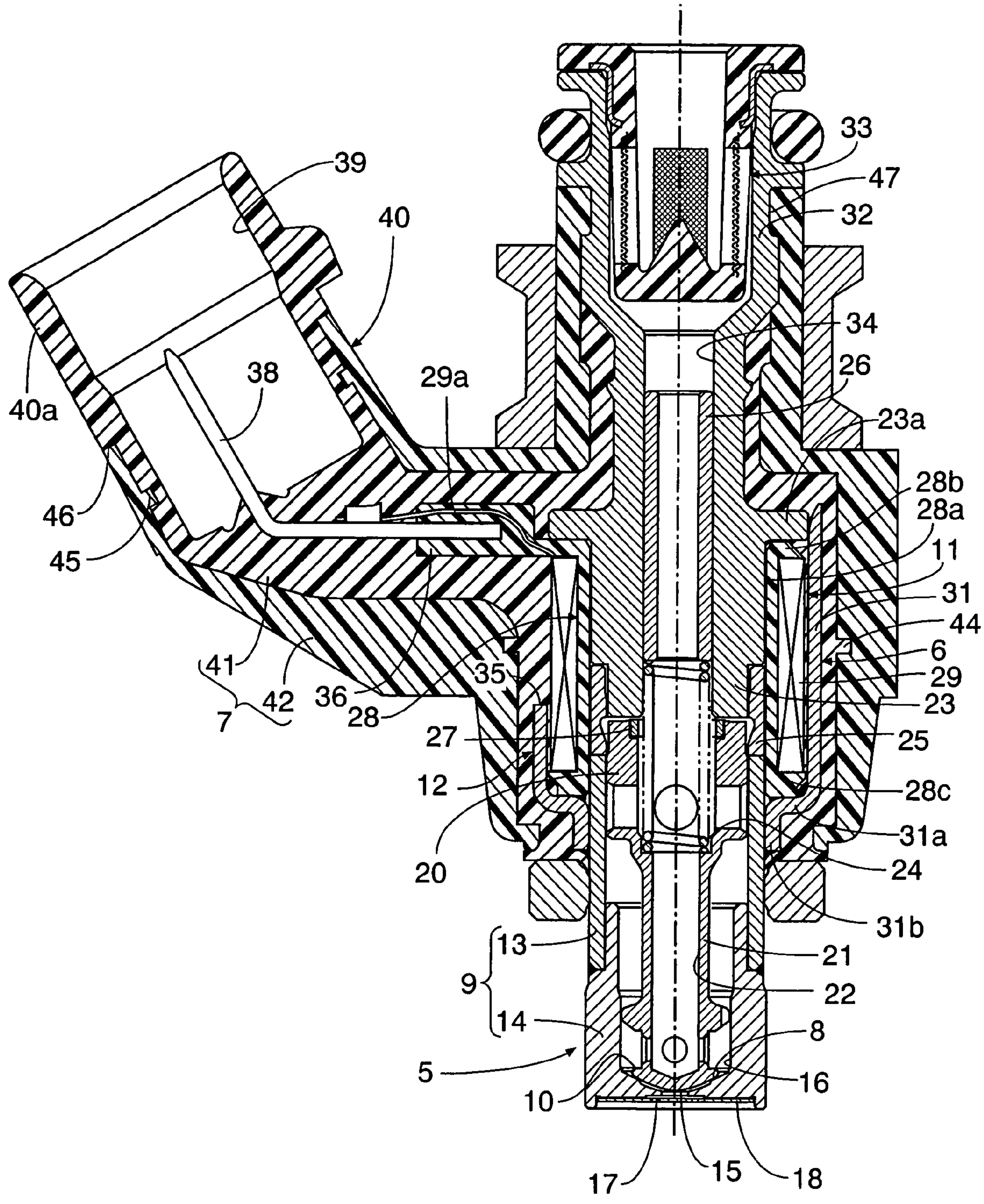
FIG. 1 is a vertical sectional view of an electromagnetic fuel injection valve of a first embodiment (first embodiment).

A first embodiment of the present invention is explained by reference to FIG. 1 to FIG. 4; referring firstly to FIG. 1, an electromagnetic fuel injection valve for injecting fuel into an engine (not illustrated) includes a valve operating section 5 in which a valve body 10 is housed within a valve housing 9 having a valve seat 8 at the front end, the valve body 10 being spring-biased in a direction that seats the valve body 10 on the valve seat 8, a solenoid section 6 in which a coil assembly 11 is housed in a solenoid housing 12 provided so as to be connected to the valve housing 9, the coil assembly 11 being capable of exhibiting an electromagnetic force for driving the valve body 10 so as to make it separate from the valve seat 8, and a resin-molded section 7 made of a synthetic resin covering at least the solenoid section 6 and having an integral power-receiving coupler 40, power-receiving connecting terminals 38 connected to a coil 29 of the coil assembly 11 facing the power-receiving coupler 40.

Figure 2:
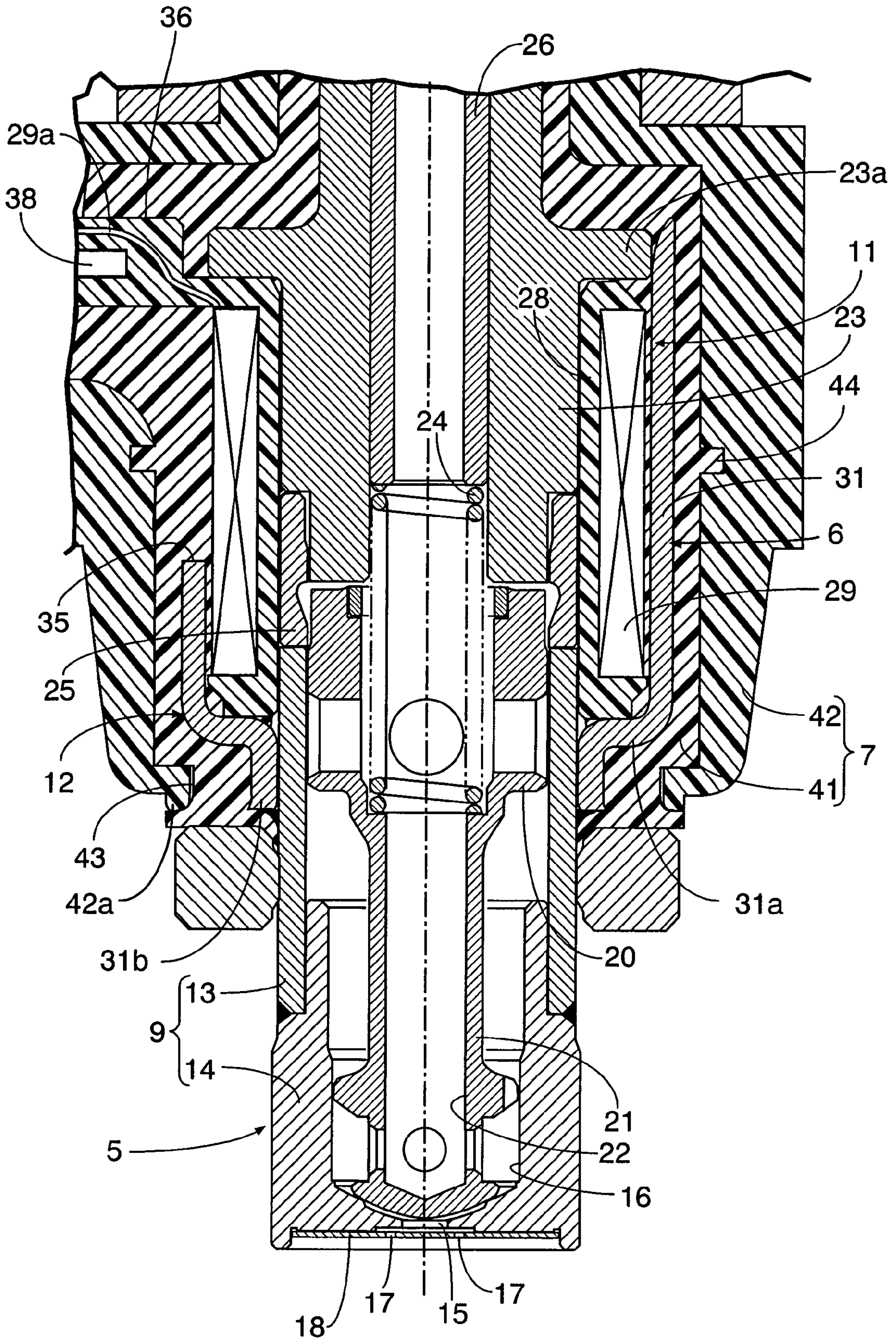
FIG. 2 is an enlarged sectional view of a front part of the electromagnetic fuel injection valve (first embodiment).

Referring in addition to FIG. 2, the valve housing 9 is formed from a cylindrical magnetic body 13 made of a magnetic metal and a valve seat member 14 that is joined in a liquid-tight manner to the front end of the cylindrical magnetic body 13. The valve seat member 14 is welded to the cylindrical magnetic body 13 in a state in which a rear end portion of the valve seat member 14 is fitted into a front end portion of the cylindrical magnetic body 13, and this valve seat member 14 is coaxially provided with a fuel outlet hole 15 opening on the front end face thereof, a tapered valve seat 8 extending from the inner end of the fuel outlet hole 15, and a guide hole 16 extending from a large diameter portion at the rear end of the valve seat 8. An injector plate 18 made of steel plate is welded in a liquid-tight manner along its entire periphery to the front end of the valve seat member 14, the injector plate 18 having a plurality of fuel injection holes 17 communicating with the fuel outlet hole 15.

A movable core 20 is slidably fitted into a rear portion of the valve housing 9, the movable core 20 forming part of the solenoid section 6, and the valve body 10, which can be seated on the valve seat 8 so as to block the fuel outlet hole 15, is formed integrally with the front end of a valve shaft 21 integrally connected to the movable core 20. A through hole 22 is formed coaxially in the movable core 20, the valve shaft 21, and the valve body 10, the through hole 22 communicating with the interior of the valve housing 9 and having a bottomed shape with its front end blocked.

The solenoid section 6 includes the movable core 20, a cylindrical fixed core 23 facing the movable core 20, a return spring 24 exhibiting a spring force that urges the movable core 20 away from the fixed core 23, a coil assembly 11 disposed so as to surround a rear portion of the valve housing 9 and the fixed core 23 while being capable of exhibiting an electromagnetic force that allows the movable core 20 to be attracted to the fixed core 23 side against the spring force of the return spring 24, and a solenoid housing 12 surrounding the coil assembly 11 so that a front end portion of the solenoid housing 12 is connected to the valve housing 9.

The rear end of the cylindrical magnetic body 13 of the valve housing 9 is coaxially joined to the front end of the fixed core 23 via a cylindrical non-magnetic body 25, which is formed from a non-magnetic metal such as stainless steel, the rear end of the cylindrical magnetic body 13 is butt-welded to the front end of the cylindrical non-magnetic body 25, and the rear end of the cylindrical non-magnetic body 25 is welded to the fixed core 23 in a state in which a front end portion of the fixed core 23 is fitted into the cylindrical non-magnetic body 25.

A cylindrical retainer 26 is press-fitted into the fixed core 23 and fixed by swaging, and the return spring 24 is disposed between the retainer 26 and the movable core 20. Furthermore, in order to avoid the movable core 20 from making direct contact with the fixed core 23, a ring-shaped stopper 27 made of a non-magnetic material is fitted into and fixed to the inner periphery of a rear end portion of the movable core 20 so that the ring-shaped stopper 27 projects slightly from a rear end face of the movable core 20 toward the fixed core 23. Furthermore, the coil assembly 11 is formed by winding a coil 29 around a bobbin 28 surrounding a rear portion of the valve housing 9, the cylindrical non-magnetic body 25, and the fixed core 23.

The solenoid housing 12 is formed from a coil case 31 and a flange portion **23*a*, the coil case 31 being made of a magnetic metal in a cylindrical shape having at one end an annular end wall 31*a* facing an end portion of the coil assembly 11 on the valve operating section 5 side and surrounding the coil assembly 11, the flange portion 23*a* protruding radially outward from a rear end portion of the fixed core 23 and facing an end portion of the coil assembly 11 on the side opposite to the valve operating section 5, and the flange portion 23*a* being magnetically coupled to the other end portion of the coil case 31. Moreover, a tubular mating portion 31*b* is coaxially provided on the inner periphery of the end wall 31*a* of the coil case 31, the cylindrical magnetic body 13 of the valve housing 9 being fitted into the tubular mating portion 31*b*, and the solenoid housing 12 is provided so as to be connected to the valve housing 9 by fitting the valve housing 9 into the tubular mating portion 31*b***.

A cylindrical inlet tube 32 is integrally and coaxially connected to the rear end of the fixed core 23, and a fuel filter 33 is mounted on a rear portion of the inlet tube 32. Moreover, a fuel passage 34 is coaxially provided in the inlet tube 32, the retainer 23, and the fixed core 23, the fuel passage 34 communicating with the through hole 21 of the movable core 20.

The resin-molded section 7 is formed so as to embed not only the coil assembly 11 and the solenoid housing 12 of the solenoid section 6 but also a part of the valve housing 9 and a majority of the inlet tube 32 while filling in a gap between the solenoid housing 12 and the coil assembly 11, and a cutout portion 35 is provided in the coil case 31 of the solenoid housing 12, the cutout portion 35 allowing a terminal boss 36 formed integrally with the bobbin 28 of the coil assembly 11 to be disposed outside the solenoid housing 12.

The power-receiving coupler 40, which forms a recess 39, is provided integrally with the resin-molded section 7, the power-receiving connecting terminals 38 connected to opposite ends of the coil 29 of the coil assembly 11 facing the recess 39, the base end of the connecting terminal 38 being embedded in the terminal boss 36, and coil ends **29*a* of the coil 29 being electrically attached to the power-receiving connecting terminals 38**.

The resin-molded section 7 is formed by double layer molding of a first resin-molded layer 41 and a second resin-molded layer 42, the first resin-molded layer 41 forming a coupler main portion **40*a* that defines a framework of the power-receiving coupler 40, and the second resin-molded layer 42 covering the first resin-molded layer 41 so that the outer periphery of the power-receiving coupler 40 is exposed from a middle part up to the extremity of the power-receiving coupler 40. In this embodiment, the entirety of the solenoid section 6, a rear part of the valve housing 9, and part of the inlet tube 32 are covered by the first resin-molded layer 41, and the second resin-molded layer 42, which covers the first resin-molded layer 41, is formed so that the outer periphery of the first resin-molded layer 41 is exposed from the middle part up to the extremity of the power-receiving coupler 40, and a front end part of the first resin-molded layer 41 is slightly exposed, the second resin-molded layer 42 covering the inlet tube 22 up to a middle part thereof while completely covering a rear part of the first resin-molded layer 41**.

Moreover, the first and second resin-molded layers 41 and 42 are formed from synthetic resins that are different from each other, but whereas the first resin-molded layer 41 is formed from a synthetic resin having a relatively high bending strength, the second resin-molded layer 42 is formed from a synthetic resin having a lower bending strength than that of the first resin-molded layer 41; for example, the first resin-molded layer 41 is formed from a glass fiber-incorporated liquid crystal polymer, and the second resin-molded layer 42 is formed from a thermoplastic polyester elastomer into which glass fiber is not incorporated, such as, for example, Hytrel (product name, manufacture by DuPont, USA).

The glass fiber-incorporated liquid crystal polymer, from which the first resin-molded layer 41 is formed, has relatively suppressed function of transmitting operating noise and is also highly rigid. In contrast, when the second resin-molded layer 41 is formed from the thermoplastic polyester elastomer into which glass fiber is not incorporated, the peak operating sound pressure can be reduced to a low level.

Figure 3:
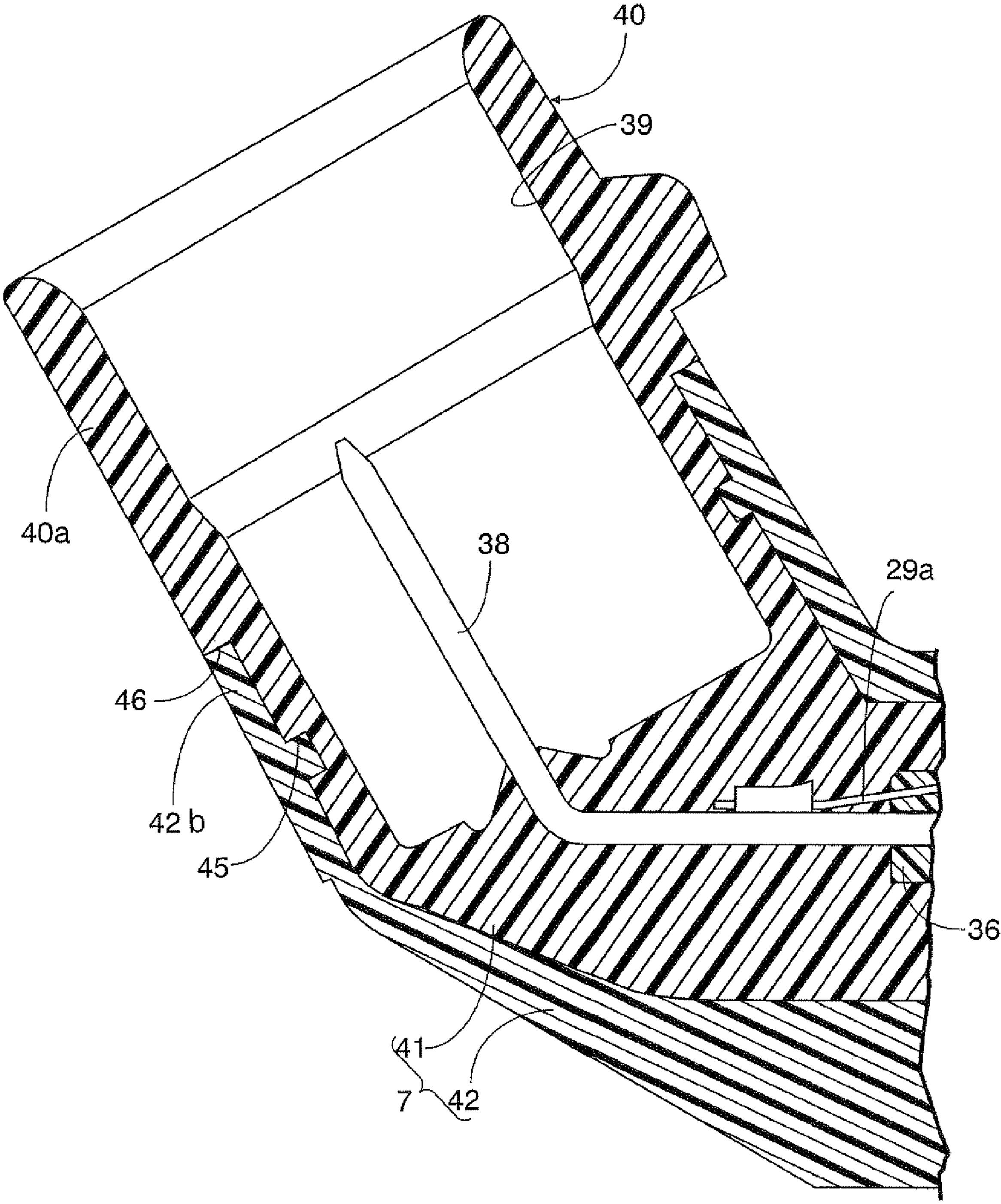
FIG. 3 is an enlarged sectional view of a power-receiving coupler (first embodiment).

Referring in addition to FIG. 3, the first resin-molded layer 41 is exposed to the outside from the middle part up to the extremity of the power-receiving coupler 40 without being covered by the second resin-molded layer 42, an endless first engagement groove 45 is provided on the outer periphery of a middle part of the coupler main portion **40*a* of the first resin-molded layer 41 so that the second resin-molded layer 42 engages with the first engagement groove 45, and an extending portion 42*b* extending outward relative to the first engagement groove 45 is formed in the second resin-molded layer 42** so that the extremity of the extending portion 42*b* abuts against an annular step portion 46 formed on the outer periphery of the coupler main portion 40*a* further toward the outside than the first engagement groove 45, the extending portion 42*b* making contact with the outer face of the coupler main portion 40*a* when in a non-engaged state and covering the coupler main portion 40*a*.

An endless second engagement groove 43 is provided on the outer periphery of the front end part of the first resin-molded layer 41 so that the entire periphery of the front edge 42*a* of the second resin-molded layer 42 engages with the second engagement groove 43. Provided on the outer periphery of the first resin-molded layer 41 in a portion, along the axial direction of the valve housing 5, that corresponds to the coil assembly 11 is an engagement projection 44, which is an endless engagement portion with which the entire inner periphery of the second resin-molded layer 42 engages, the entire inner periphery of the second resin-molded layer 42 engaging with the engagement projection 44 so that rearward displacement thereof is restrained by the engagement projection 44.

Furthermore, a rear part of the second resin-molded layer 42 covers up to the middle part of the inlet tube 22 while completely covering the rear part of the first resin-molded layer 41, and an endless third engagement groove 47 is formed on the outer periphery of the middle part of the inlet tube 22 so that the entire periphery of a rear end part of the second resin-molded layer 42 engages with the third engagement groove 47.

The operation of this embodiment is now explained. The resin-molded section 7 is formed by double layer molding of the first resin-molded layer 41 and the second resin-molded layer 42, the first resin-molded layer 41 covering at least the solenoid section 6 and forming the coupler main portion 40*a*, which defines the framework of the power-receiving coupler 40, and the second resin-molded layer 42 being formed from the material that has a lower bending strength than that of the first resin-molded layer 41 and covering the first resin-molded layer 41 so that the first resin-molded layer 41 is exposed from the middle part up to the extremity of the power-receiving coupler 40.

The connections between the coil 29 of the coil assembly 11 and the power-receiving connecting terminals 38 are therefore covered by the first resin-molded layer 41, and a strength that can ensure the reliability of the electrical connections can be imparted to the resin-molded section 7 by forming the coupler main portion 40*a*, which defines the framework of the power-receiving coupler 40, from the first resin-molded layer 41. Furthermore, the second resin-molded layer 42 covering the first resin-molded layer 41 is formed from the synthetic resin having a relatively low bending strength, generation of operating noise can be suppressed effectively and, compared with an arrangement in which the entirety of a fuel injection valve is covered by a soundproofing cover, the entire electromagnetic fuel injection valve can be made compact. Moreover, since up to the middle part of the power-receiving coupler 40 is formed by double layer molding, generation of operating noise from the power-receiving coupler 40 can be reduced effectively by the second resin-molded layer 42 while obtaining a strength required for the power-receiving coupler 40 by virtue of the first resin-molded layer 41.

Moreover, since the first resin-molded layer 41 is formed from the glass fiber-incorporated liquid crystal polymer, and the glass fiber-incorporated liquid crystal polymer has relatively suppressed function of transmitting operating noise and is highly rigid, the strength for ensuring reliability of the electrical connections can be increased, and the generation of operating noise can be suppressed more effectively.

Furthermore, since the second resin-molded layer 42 is formed from the thermoplastic polyester elastomer into which glass fiber is not incorporated, and the thermoplastic polyester elastomer into which glass fiber is not incorporated has excellent elasticity, the generation of operating noise can be suppressed effectively.

Moreover, the endless second engagement groove 43 is provided on the outer periphery of the front end part of the first resin-molded layer 41, the entire periphery of the front edge 42*a* of the second resin-molded layer 42 engaging with the second engagement groove 43, and the engagement projection 44 is provided on the outer periphery of the first resin-molded layer 41 in the portion, along the axial direction of the valve housing 9, that corresponds to the coil assembly 11, the entire inner periphery of the second resin-molded layer 42 engaging with the engagement projection 44 so as to restrain rearward displacement of the second resin-molded layer 42.

When cooling is carried out after molding the resin-molded section 7 having the double layer structure comprising the first resin-molded layer 41 and the second resin-molded layer 42, which are formed from the synthetic resins that are different from each other, the second resin-molded layer 42 attempts to shrink so that the front edge 42*a* separates from the second engagement groove 43 of the front end part of the first resin-molded layer 41, but the endless engagement projection 44 provided on the outer periphery of the first resin-molded layer 41 so as to restrain the rearward displacement of the second resin-molded layer 42 is disposed in the portion corresponding to the coil assembly 11. Therefore, the distance between the second engagement groove 43 and the engagement projection 44 is relatively short, that is, the length of a section of the second resin-molded layer 42 that attempts to shrink so as to separate the front edge 42*a* from the second engagement groove 43 is relatively short. As a result, even when the second resin-molded layer 42 shrinks, the amount of displacement in a direction in which the front edge 42*a* of the second resin-molded layer 42 separates from the second engagement groove 43 is very small, and it is possible to suppress lifting of the front edge 42*a* of the second resin-molded section 42 from the front end part of the first resin-molded section 41, thus preventing moisture, etc. from entering between the front end parts of the two resin-molded layers 41 and 42 and thereby improving the merchantability.

Furthermore, the endless first engagement groove 45 is provided on the outer periphery of the middle part of the coupler main portion 40*a* of the first resin-molded layer 41, the second resin-molded layer 42 engaging with the first engagement groove 45, and the extending portion 42*b*, which extends further outward than the first engagement groove 45, is formed in the second resin-molded layer 42 so that the extending portion 42*b* makes contact with the outer face of the coupler main portion 40*a* when in a non-engaged state and covers the coupler main portion 40*a*.

Figure 4:
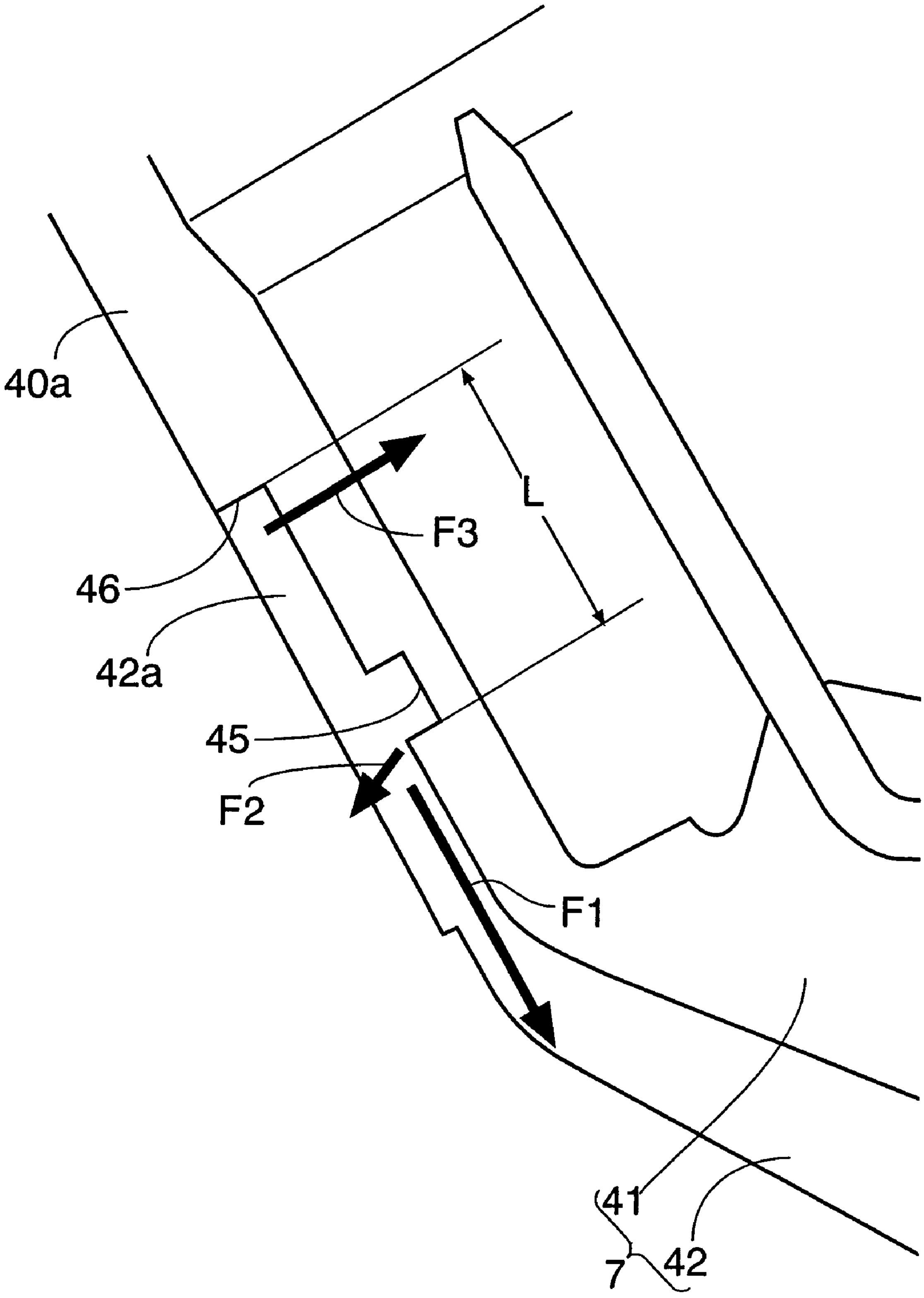
FIG. 4 is a diagram for explaining the stress acting on a portion of a second resin-molded layer that corresponds to the power-receiving coupler (first embodiment).

Therefore, as shown in FIG. 4, when cooling is carried out after molding the power-receiving coupler 40, a shrinking stress F1 acts on the second resin-molded layer 42 further toward the inside than the portion that engages with the first engagement groove 45 causing it to shrink toward the solenoid section 6, and this generates a reaction force F2 in the portion of the second resin-molded layer 42 corresponding to the first engagement groove 45 in a direction in which it separates from the first engagement groove 44. However, a shrinking stress F3 in a direction toward the outer periphery of the coupler main portion 40*a* acts against the reaction force F2 in the extending portion 42*b* of the second resin-molded layer 42 that extends further outward than the first engagement groove 45, and by appropriately setting a distance L from the inner side of the first engagement groove 45 to the extremity of the extending portion 42*b*, it is possible to make the shrinking stress F3 in the direction toward the outer periphery of the coupler main portion 40*a* larger than the reaction force F2.

As a result, it is possible to prevent a gap or a bulge from occurring in the boundary section between the two resin-molded layers 41 and 42 in the outer peripheral part of the power-receiving coupler 40 due to shrinkage when the second resin-molded layer 42 is cooled, thus improving the connectivity of a power-supplying coupler (not illustrated) to the power-receiving coupler 40 and the merchantability.

Embodiment 2

Figure 5:
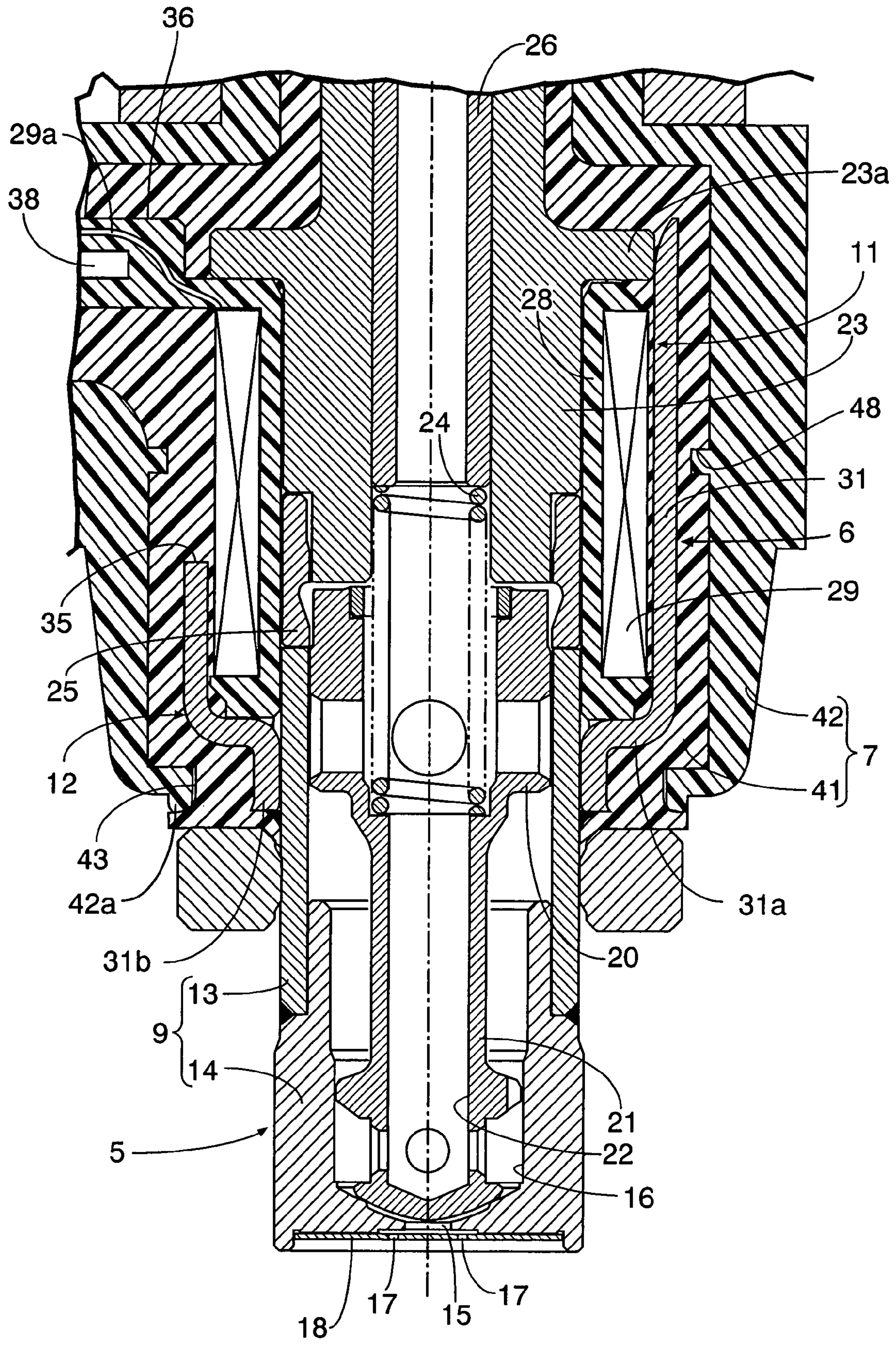
FIG. 5 is an enlarged sectional view of a front part of an electromagnetic fuel injection valve of a second embodiment (second embodiment).

FIG. 5 shows a second embodiment of the present invention; an engagement portion provided on the outer periphery of a first resin-molded layer 41 in a portion, along the axial direction of a valve housing 5, that corresponds to a coil assembly 11 may be an endless engagement recess 48, and the same effects as those of the above-mentioned first embodiment can be exhibited by restraining rearward displacement of a second resin-molded layer 42 by virtue of such an engagement recess 48.

Embodiment 3

Figure 6:
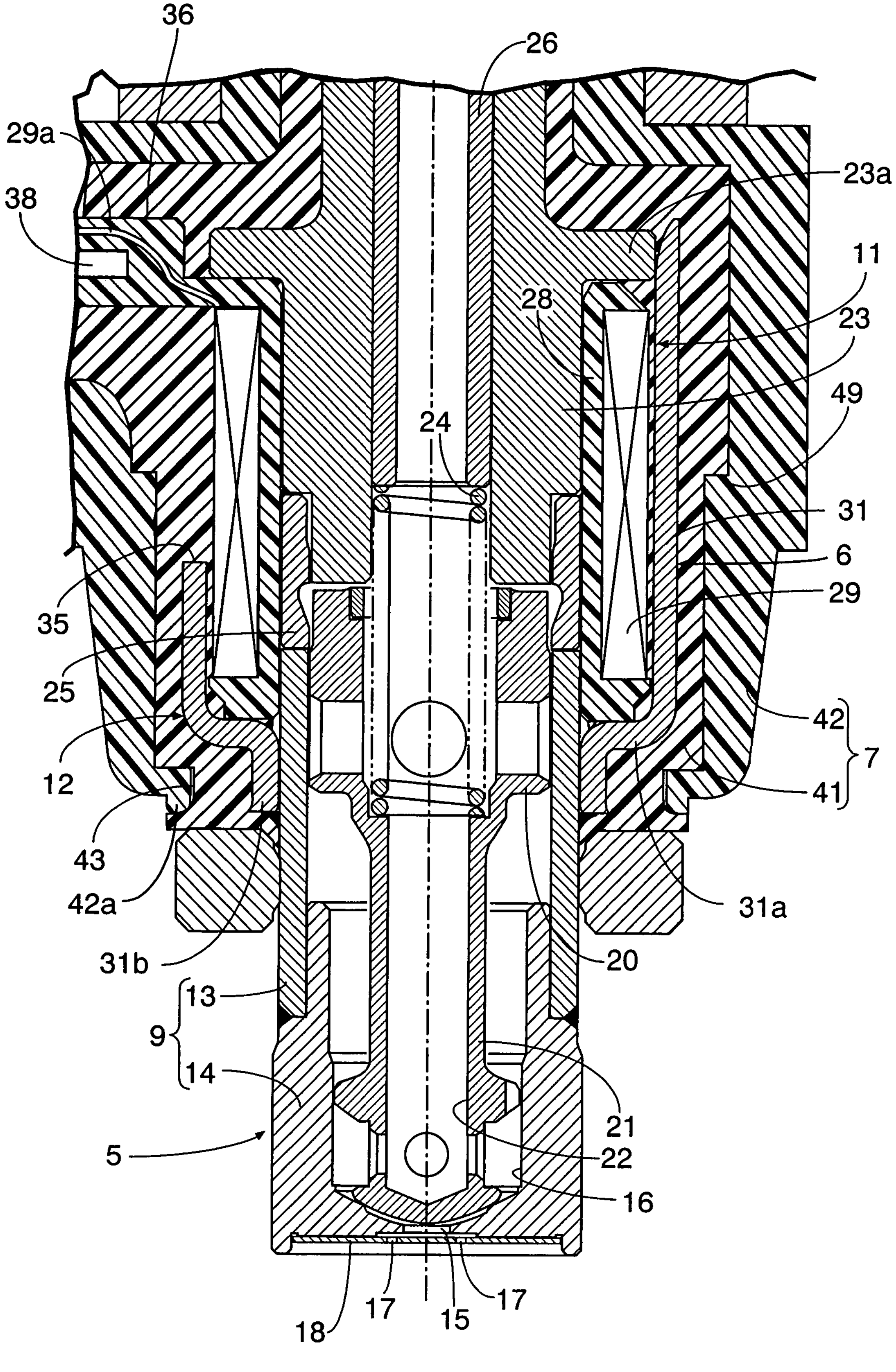
FIG. 6 is an enlarged sectional view of a front part of an electromagnetic fuel injection valve of a third embodiment (third embodiment).

FIG. 6 shows a third embodiment of the present invention; an engagement portion provided on the outer periphery of a first resin-molded layer 41 in a portion, along the axial direction of a valve housing 5, that corresponds to a coil assembly 11 may be an endless engagement step 49 facing forward, and the same effects as those of the above-mentioned first and second embodiments can be exhibited by restraining rearward displacement of a second resin-molded layer 42 by virtue of such an engagement step 49.

Embodiments of the present invention are explained above, but the present invention is not limited to the above-mentioned embodiments and can be modified in a variety of ways as long as it does not depart from the spirit and scope of the present invention described in the claims.

The invention claimed is:

1. An electromagnetic fuel injection valve comprising:

a valve operating section in which a valve body is housed within a valve housing having a valve seat in a front end part, the valve body being spring-biased in a direction that seats the valve body on the valve seat, a solenoid section in which a coil assembly is housed within a solenoid housing provided so as to be connected to the valve housing and extend rearward, the coil assembly being capable of exhibiting an electromagnetic force for driving the valve body so as to make the valve body separate from the valve seat, a resin-molded section in which a first resin-molded layer, which is made of a synthetic resin, covers the solenoid section, and forms a coupler main portion that defines a framework of a power-receiving coupler, a power-receiving connecting terminal being connected to a coil of the coil assembly and facing the power-receiving coupler, is covered by a second resin-molded layer made of a synthetic resin that is different from that of the first resin-molded layer so that an outer face of the coupler main portion is exposed from a middle part up to the extremity of the coupler main portion, an endless engagement groove provided on the outer periphery of the middle part of the coupler main portion of the first resin-molded layer, the second resin-molded layer engaging with the endless engagement groove, and an extending portion extending further outward than the engagement groove is formed in the second resin-molded layer so that the extending portion makes contact with an outer face of the coupler main portion when in a non-engaged state and covers the coupler main portion.

2. The electromagnetic fuel injection valve according to claim 1, wherein an endless second engagement groove is provided on the outer periphery of a front end part of the first resin-molded layer, the entire periphery of a front edge of the second resin-molded layer engaging with the second engagement groove, and an engagement portion is provided on the outer periphery of the first resin-molded layer in a portion, along the axial direction of the valve housing, that corresponds to the coil assembly, the entire inner periphery of the second resin-molded layer engaging with the engagement portion so as to restrain rearward displacement of the second resin-molded layer.

* * * * *